(12) United States Patent
Lonkar

(10) Patent No.: US 12,550,097 B2
(45) Date of Patent: Feb. 10, 2026

(54) CONFIGURABLE OPTIONS FOR DEVICE REGISTRATION IN WIRELESS COMMUNICATION NETWORKS

(71) Applicant: T-MOBILE INNOVATIONS LLC, Overland Park, KS (US)

(72) Inventor: Shon Lonkar, Maple Valley, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 340 days.

(21) Appl. No.: 18/314,001

(22) Filed: May 8, 2023

(65) Prior Publication Data

US 2024/0381284 A1 Nov. 14, 2024

(51) Int. Cl.
*H04W 60/04* (2009.01)
*H04W 28/02* (2009.01)
*H04W 76/10* (2018.01)

(52) U.S. Cl.
CPC ....... *H04W 60/04* (2013.01); *H04W 28/0268* (2013.01); *H04W 76/10* (2018.02)

(58) Field of Classification Search
CPC ..... H04W 76/12; H04W 60/00; H04W 48/18; H04W 88/16; H04W 60/04; H04W 76/10; H04W 28/0268; H04L 12/1407; H04L 41/0893; H04L 41/0894; H04L 63/20; H04L 12/1435; H04L 12/1492; H04L 12/1496; H04L 41/28; H04L 41/50; H04L 41/5019; H04L 43/028; H04L 47/20; H04L 47/24; H04L 47/78; H04L 63/0245; H04L 63/0254; H04L 63/10
See application file for complete search history.

(56) References Cited

U.S. PATENT DOCUMENTS

| 2018/0234915 | A1* | 8/2018 | Zait | H04W 48/16 |
| 2019/0109721 | A1* | 4/2019 | Qiao | H04L 47/20 |
| 2019/0158985 | A1* | 5/2019 | Dao | H04W 28/04 |
| 2020/0068445 | A1* | 2/2020 | Wu | H04W 36/1443 |
| 2020/0280892 | A1* | 9/2020 | Chen | H04W 8/08 |
| 2021/0392539 | A1* | 12/2021 | Guo | H04W 28/22 |
| 2022/0022089 | A1* | 1/2022 | Zhu | H04W 56/001 |
| 2022/0361272 | A1* | 11/2022 | Sugawara | H04W 76/12 |
| 2023/0163984 | A1* | 5/2023 | Shan | H04M 15/66 370/259 |
| 2024/0251331 | A1* | 7/2024 | Ding | H04W 48/12 |

FOREIGN PATENT DOCUMENTS

| DE | 102021100911 A1 * | 7/2021 | H04L 41/0894 |
| WO | WO-2016128015 A1 * | 8/2016 | H04L 63/10 |

* cited by examiner

*Primary Examiner* — Matthew C Sams

(57) ABSTRACT

Technology is disclosed herein for registering a user device for access to a wireless network. In an implementation, a session manager of a wireless network receives a registration request for access to the network from a user device. The session manager determines a workflow configuration for the access based on parameters relating to the registration request. Prior to sending a request for an access session to a policy enforcement function, the session manager selects a traffic routing function of the wireless network for device access to the network and requests a traffic management session from the traffic routing function. The session manager sends a request for an access session to the policy enforcement function which includes traffic routing information. The session manager sends the user device information by which the user device can access the wireless network.

20 Claims, 7 Drawing Sheets

CONFIGURABLE OPTIONS FOR DEVICE REGISTRATION IN WIRELESS COMMUNICATION NETWORKS

TECHNICAL FIELD

Aspects of the disclosure are related to the field of wireless communication networks and in particular to establishing access to a network.

BACKGROUND

In the realm of wireless communication networks, when a user device requests access to a network, e.g., for making a call or accessing an online service, the network establishes access to the network by coordinated actions of multiple network functions, each charged with performing particular tasks related to enable the access. These coordinated actions include the network functions exchanging information relating to the access including which network functions are involved, what type of access is to be allowed, where the user device is located, how the user device is to be charged for the access, and so on.

The network functions communicate via dedicated pathways according to the network's service-based architecture. In some situations, communication between network functions may fail. For example, network congestion may cause transit loss stemming from packets being dropped or corrupted. When transit losses occur, this can cause call set-up requests or other types of access requests to fail, network functions to accumulate stale (i.e., unusable) information, network utilization inefficiencies, and degradation in network KPIs.

OVERVIEW

Technology, including systems, methods, and devices, is disclosed herein for registering a user device for access to a wireless network. In an implementation, a session manager of a wireless network receives a registration request for access to the network from a user device. The session manager determines a workflow configuration for the access based on parameters relating to the registration request. Based on the workflow configuration, the session manager selects a traffic routing function of the wireless network for the access and requests a traffic management session from the traffic routing function. The request for the traffic management session is sent prior to the session manager sending a request for an access session to a policy enforcement function of the wireless network. The session manager sends a request for an access session to the policy enforcement function which includes traffic routing information. The session manager sends the user device a response to the registration request which includes information by which the user device accesses the wireless network.

In some implementations, the traffic routing function includes a User Plane Function, the policy enforcement function includes a Policy Control Function, and the session manager includes a Session Management Function of the wireless network. In the same or other implementations, the traffic management session includes a Packet Forwarding Control Protocol session.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

DETAILED DESCRIPTION

Figure 1:
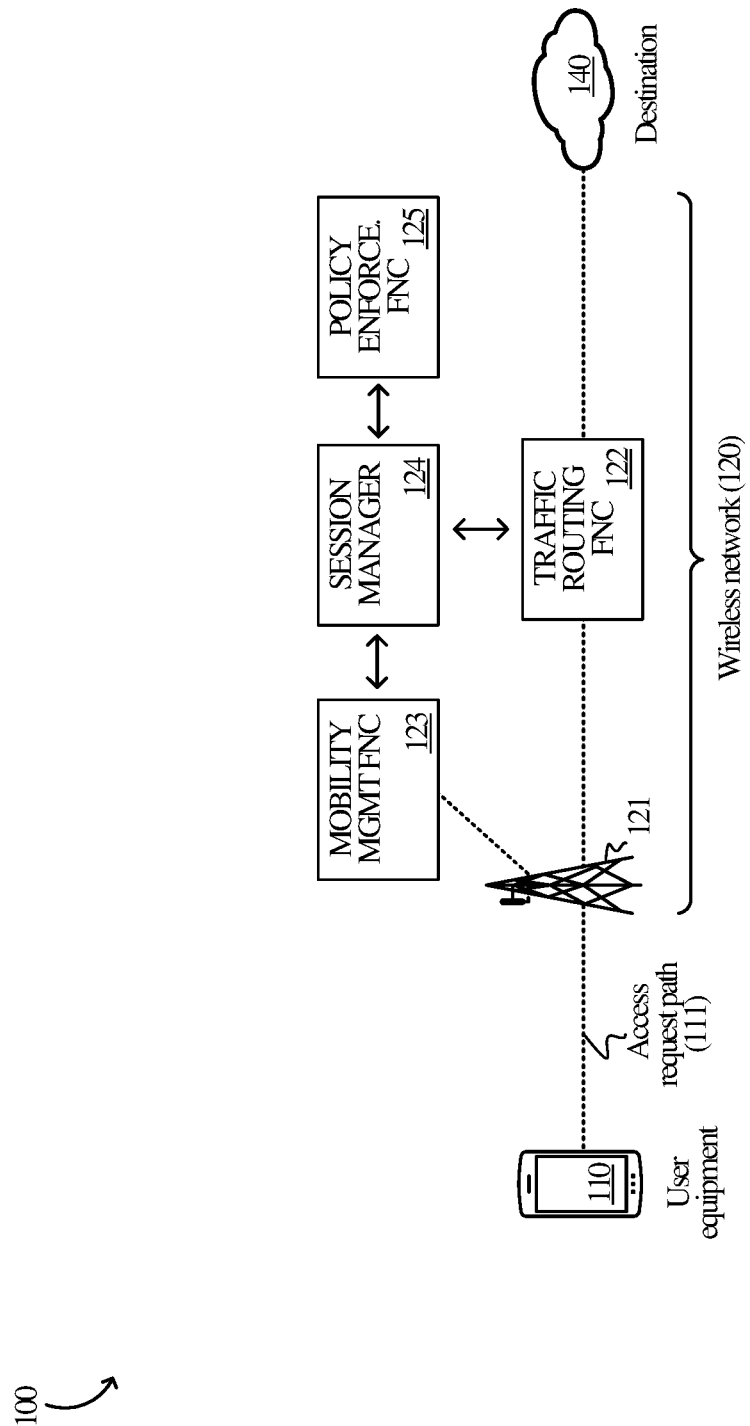
FIG. 1 illustrates an operational environment for operating a wireless network in an implementation.

Systems, methods, and devices are disclosed herein for registering a user device for access to a wireless network. In an implementation, a session manager of a wireless network receives a registration request for access to the network from a user device. For example, the user device may request access to the network to communicate with an endpoint such as another user device of the same or other wireless network. Prior to contacting a policy enforcement function of the wireless network for an access session, the session manager identifies a traffic routing function of the wireless network which will handle data traffic between the user device and the wireless network. With a traffic routing function identified, the session manager sends a request for session creation to a policy enforcement function of the wireless network which includes an identity of the traffic routing function. When the session manager receives an acknowledgement of the session creation from the policy enforcement function, it sends a response to the user device which includes information by which the user device will communicate with the wireless network.

In an implementation of the technology disclosed herein, a user device requests to register for access to a wireless network via an access node, such as a radio access node (RAN) or Wifi access node. The wireless network may include a number of network functions which execute control plane operations, such as mobility management functions, session managers, and policy enforcement functions. The wireless network also includes network functions which execute data plane operations, such as traffic routing functions which bridge the control plane and user plane of the wireless network and which route data traffic according to applicable policies vis a vis the user device. The registration request is received by a mobility management function of the wireless network which initiates a process to register the device with the network to create an access session, such as a Protocol Data Unit (PDU) session. A session, in various implementations, is a logical connection between a user device and a wireless network that allows data to be transferred and managed using a set of policies and rules defined by or sourced from various network functions.

To initiate the process of device registration, the mobility management function sends a request for the access session to a session manager of the wireless network. The session manager in turn ascertains from the request a workflow ("flow") configuration for creating access, such as a standard or default workflow configuration or a streamlined or consolidated workflow configuration. The standard or default workflow configuration may be, in some implementations, a workflow which complies with the 3rd Generation Partnership Project (3GPP) standard for 5G wireless networks.

To determine the flow configuration, the session manager receives parameters relating to the request for access from the mobility management function. The parameters relating to the request for access include a device identifier, Domain Network Name (DNN) or Access Point Name (APN), a device location, a Public Land Mobile Network (PLMN), radio access type (e.g., 5G, LTE, WLAN, etc.), device relationship with the wireless network, or a combination of parameters. In some scenarios, the parameters are assessed according to whether the type or nature of the requested access is more suited to a streamlined flow configuration than to a default flow configuration and vice versa. For example, according to the DNN or APN of the request, when the request relates to access to a data network, such as the Internet, the session manager may select a standard or default flow configuration. If, however, the access request relates to a voice call, video calls, SMS, or other IMS-related access, the session manager may elect to use a streamlined flow configuration.

Workflow configuration or selection may also depend on a subscription relationship between the device and the network based on a device identifier, such as a Subscription Permanent Identifier (SUPI) or Subscription Concealed Identifier (SUCI), and the PLMN. For example, if the device is subscribed to the wireless network, the session manager may implement a streamlined flow configuration for registration requests from that device. On the other hand, if the device is visiting the wireless network, i.e., roaming, and requesting access corresponding to a data-type APN, then the session manager may implement the default flow configuration, i.e., sending an initial request to the policy enforcement function (prior to reaching out the traffic routing function) which will be denied by the policy enforcement function at the outset, thus obviating any need to set up a traffic management session with a traffic routing function.

In some scenarios, the session manager relies on a combination of two or more parameters to select a flow configuration. For example, if the session manager receives a request for network access for a voice call via Wifi access (or VoIP-voice over IP-call) for a subscribed device, the combination of parameters may direct the session manager to use a streamlined workflow.

Upon determining that the user device qualifies for a streamlined workflow, the session manager identifies or selects a traffic routing function to handle data plane traffic between the user device and the wireless network. Identifying the traffic routing function may be based on the geographic location of the user device, a Quality of Service for the network slice corresponding to the requested access, the wireless network topology, and so on. The session manager sends the traffic routing function a request for a traffic management session. In response to the request, the session manager receives an acknowledgement from the traffic routing function indicating that a traffic management session has been created with respect to the request for access.

Having identified and established a traffic management session with a traffic routing function for the access request, the session manager sends a request to a policy enforcement function for an access session, such as a PDU session. The request includes an Internet Protocol (IP) address allocated by the session manager for the user device and the identified traffic routing function. When the session manager receives the PDU session information from the policy enforcement function, the session manager forwards the PDU session information to the user device via the mobile management function.

In a 5G wireless network, the session manager may be a Session Management Function (SMF); traffic routing function may be a User Plane Function (UPF); the mobility management function may be an Access and Mobility Management Function (AMF); and the policy enforcement function may be a Policy Control Function (PCF). In a 5G network, a traffic management session may be a Packet Forwarding Control Protocol (PFCP) session. In an LTE network, the mobility management function may be a Mobility Management Entity (MME).

In an implementation where the user device does not qualify for a streamlined workflow, access is instead established according to a standard or default workflow. According to a standard workflow, the session manager sends a first request for the PDU session to the policy enforcement function prior to selecting a traffic routing function. Upon receiving an acknowledgement of the request from the policy enforcement function, the session manager sends a request for a traffic management session to a selected traffic routing function, then sends a second message to the policy enforcement function which includes an IP address for the traffic routing function to complete the request. When the policy enforcement function receives the IP address for the traffic routing function, it creates the PDU session based on the first and second requests and sends an acknowledgement of session creation to the session manager.

The technical benefit of the streamlined workflow for call set-up or other network access is to reduce the number of interactions between the session manager and the policy enforcement function by which an access session for a user device is established. In a standard flow configuration, if the second message fails in transit (i.e., is not successfully transmitted from the session manager to the policy enforcement function), there will be a session mismatch between the session manager and the policy enforcement function and registration will fail-network access by the user device, such as call set-up, fails. With session mismatch, the policy enforcement function accumulates in storage incomplete session information from the first request, now unusable, until such time as the function is purged of unusable data. Moreover, when access is retried after failure, this results in inefficient use of the wireless network and suboptimal key performance indicators (KPIs) such as those relating to network utilization and efficiency.

In contrast to the standard workflow configuration, by consolidating the first and second requests to create the PFCP session, the streamlined workflow enables faster access or faster call set-up, a higher rate of success in establishing network access for user devices, more efficient user of wireless network resources, and less accumulation of unusable data at the policy enforcement function.

Turning now to the Figures, FIG. 1 illustrates operational environment 100 for configuring a workflow for device registration with a wireless network in an implementation. Operational environment 100 includes user equipment 110, wireless network 120, and destination 140. Wireless network 120 includes RAN 121, and mobility management function 123, session manager 124, and policy enforcement function 125 which operate on the control plane of wireless network 120. Wireless network 120 also includes traffic routing function 122 which bridges the control plane and data plane of wireless network 120, handling data traffic according to access control policies provided by various control plane elements. User equipment 110 sends a request along access request path 111 to wireless network 120 in order to connect with destination 140.

User equipment (UE) 110 is representative of smartphones, computers, sensors, controllers, and/or some other user apparatus with processing circuitry for wireless communication. UE 110 exchanges wireless communication signals with RAN 121 over radio frequency bands. RAN 121 is representative of equipment using radio frequencies to provide wireless connectivity to devices, such as Fifth Generation (5G) RANs, long-term evolution (LTE) RANs, gNodeBs, eNodeBs, NB-IoT access nodes, LP-WAN base stations, wireless relays, Wifi access nodes, Wifi hotspots, ENET access nodes, Bluetooth access nodes, and/or other wireless or wireline network transceivers.

UE 110 and RAN 121 are representative of wireless communication devices or radios which wirelessly communicate using protocols such as Fifth Generation New Radio (5GNR), 5G Advanced, LTE, Institute of Electrical and Electronic Engineers (IEEE) 802.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA).

Figure 7:
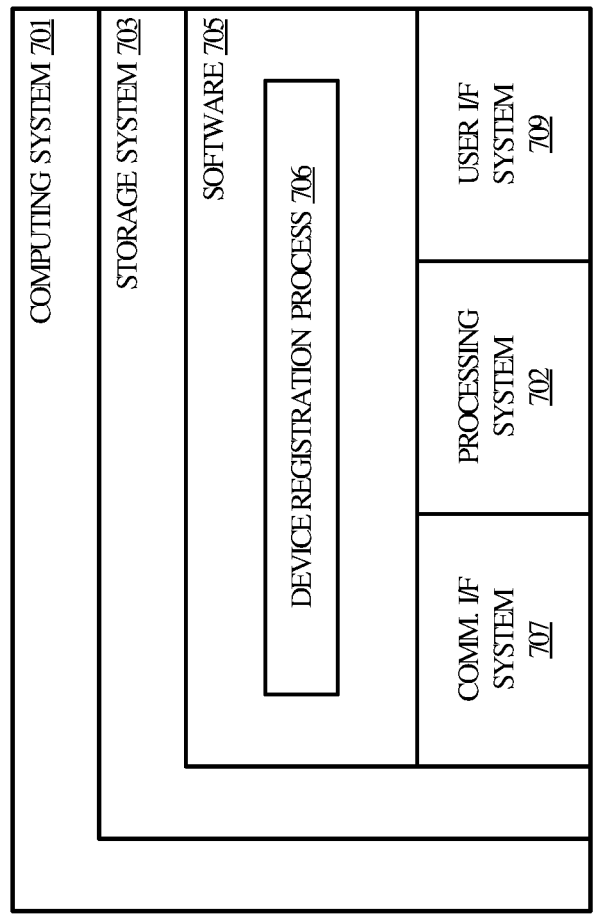
FIG. 7 illustrates a computing system suitable for implementing the various operational environments, architectures, processes, scenarios, and sequences discussed below with respect to the other Figures.

Traffic routing function 122, mobility management function 123, session manager 124, and policy enforcement function 125 of wireless network 120 are representative of network functions and elements which constitute the control plane and user/data plane of a wireless communication network. For example, traffic routing function 122, mobility management function 123, session manager 124, and policy enforcement function 125 can include UPFs, AMFs, SMFs, PCFs, and UDMs, as well as other network functions. Traffic routing function 122, mobility management function 123, session manager 124, and policy enforcement function 125 are implemented on one or more suitable computing devices, of which computing device 700 of FIG. 7 is representative. Examples include server computers, blade servers, and the like. Network elements 103 may be implemented in the context of one or more data centers, in a co-located or distributed manner, or in some other arrangement.

Destination 140 is representative of an endpoint of a communication path from UE 110 through wireless network 120. Destination 140 can include an endpoint in communication with UE 110 for the transmission of IMS communication, such as a voice call, SMS, video call, or other IMS transmission. For example, destination 140 may be another user equipment or device.

In operation, UE 110 sends a registration request to wireless network 130 for the purpose of making a voice call to destination 140. UE 110 is in wireless communication with RAN 121 of an access network of wireless network 120. (It will be assumed for the purpose of illustrating an operational example that UE 110 is subscribed device of wireless network 120 and that destination 140 is a smartphone of another user.) RAN 121 sends the registration request to mobility management function 123 which in turn generates and sends a request to session manager 124 to create a PDU session for UE 110.

Although illustrated as a tower, RAN 121 may also include other types of access nodes, such as a WLAN access nodes, and communication with mobility management function 123 may be relayed through a Non-3GPP Inter-Working Function (N3IWF) network function (not shown) of wireless network 120.

Continuing with the operational example, to create the PDU session for UE 110, session manager 124 consults parameters within the request to determine a workflow for establishing the PDU session. Session manager 124 determines that the registration request qualifies for a consolidated workflow based on UE 110 being a subscriber to wireless network 120 and the type of access (IMS), session manager 124 identifies traffic routing function 124 to handle the data traffic associated with the request and sends a PFCP request to traffic routing function 122. To select traffic routing function 124 from among a pool of traffic routing functions of wireless network 120, session manager 124 may consult the geographic location of UE 110; the type of service requested, particular as relating to network slice information, Quality of Service (QoS), and applicable policies; availability of traffic routing function 122; and other information.

Upon receiving an acknowledgement from traffic routing function 122 that a PFCP session has been created, session manager 124 sends a request to policy enforcement function 125 to create a session in association with the registration request. The request sent to policy enforcement function 125 includes a UE ID allocated to UE 110 by session manager 124 and identification of the particular traffic routing function (here, traffic routing function 122) selected for handling the data traffic for the call. Policy enforcement function 125 establishes a PDU session for the device which includes policies received from other network functions of wireless network 120, such as a Unified Data Management (UDM) or Unified Data Repository (UDR) function (not shown).

Policy enforcement function 125 sends a confirmation or acknowledgement of session establishment to session manager 124 which proceeds with signaling to mobility management function 123 the session information by which UE 110 will access wireless network 120.

In an implementation comprising a 5G-NR wireless communication network context, the operations of session manager 124 may be performed by an SMF, of traffic routing function 122 by a UPF, of policy enforcement function 125 by a PCF, and of mobility management function 123 by an AMF. Session manager 124 may interface with policy enforcement function 125 by means of an N7 interface, with traffic routing function 122 by means of an N4 interface, and with mobility management function 123 by means of an N11 interface.

Figure 2:
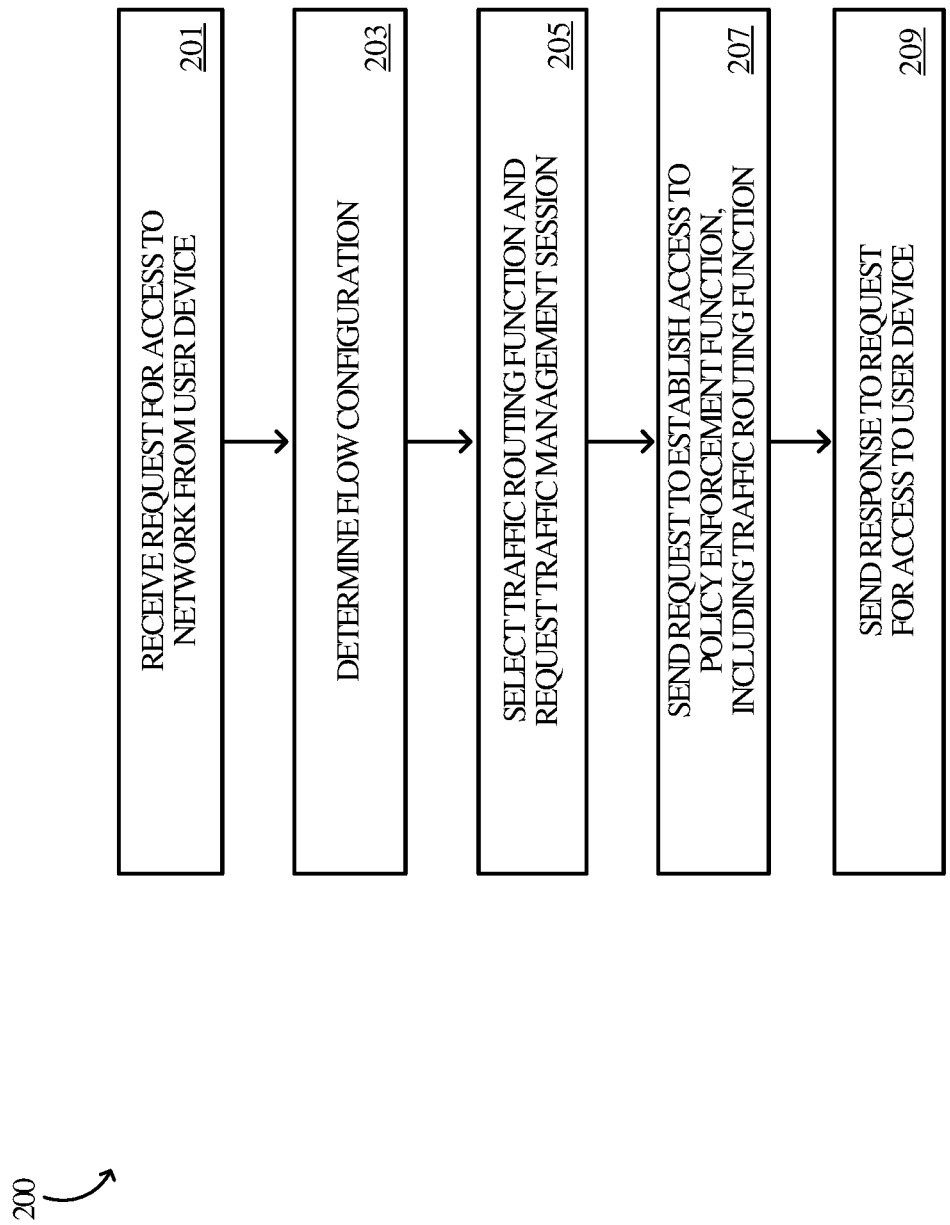
FIG. 2 illustrates a method of registering a user device for access to a wireless network in an implementation.

FIG. 2 illustrates process 200 for registering a user device for access to wireless network in an implementation. Process 200 may be implemented on one or more computing devices, such as server computers or computers in the context of a network data center, according to program instructions which direct the computing devices to function as follows, referring parenthetically to the steps in FIG. 2 and in the singular for the sake of clarity.

In process 200, a session manager function of a wireless network receives a request to register a user device for access to the wireless network (step 201). In an implementation, the session manager receives a registration request relayed by a mobility management function of the wireless network from a user device. The registration request from the mobility management function may include contextual information such as a time zone of the device, a device location, a PLMN of the request, a radio access type (RAT) of the request, a session identifier for a session created by the mobility management function in association with the request, and user device identifier. The mobility management function may be an AMF of a 5G network, an MME of an LTE network, or other implementation in other types of wireless networks.

Based on the parameters of the request received from the mobility management function, the session manager determines a flow configuration for registering the device for access to the network (step 203). In an implementation, the session manager determines a workflow which is most suitable for the request. For example, for IMS access, the session manager may select a streamlined or consolidated workflow for the registration process. Where the parameters indicate the request will be denied on the basis of an access control policy, the session manager may select the workflow which will be most expeditious in handling the request, such as the standard or default workflow.

When the session manager selects a consolidated workflow, the session manager selects a traffic routing function to handle the data traffic associated with the access and requests the traffic routing function set up a traffic management session for the requested access (step 205). By selecting a traffic routing function and soliciting a traffic management session (e.g., a PFCP session) prior to sending a request to the policy enforcement function for an access session, the session manager is able to submit a complete request to the policy enforcement function by which the policy enforcement function can create an access session (e.g., a PDU session). The policy enforcement function need not allocate space in its database for the request and await a second message from the session manager including the traffic routing information, making the policy enforcement function and indeed the registration process subject to an additional point of failure. When the traffic routing function creates a session for the requested access, it returns an acknowledgement of the request to the session manager.

With a traffic routing function selected and traffic routing session established, the session manager sends a request to establish network access for the user device to the policy enforcement function (step 207). In an implementation, the request includes the traffic routing information, such as an IP address for the traffic routing function, and a user equipment identifier assigned by the session manager to the device. The request also includes a DNN of the request and the PLMN and RAT associated with the request to the policy enforcement function. Upon receiving the request, the policy enforcement function creates a session for the request, such as a PDU session, which includes access policies which will govern the access such as charging rules, data transfer allocations, and so on. The policy enforcement function may receive policies from other network functions such as UDM of the wireless network. Upon completing the establishment of a session, the policy enforcement function sends an acknowledgement of the request to the session manager.

With the access session established, the session manager sends a response to the request to the user device (step 209). In an implementation, the response includes the information compiled by the various network functions, such as the session manager, the policy enforcement function, and the traffic routing function, which will allow the user device to access the wireless network and which will govern the manner in which the device is allowed to access the network.

Referring to FIG. 1, operational environment 100 illustrates a brief example of process 200 as employed by elements of operational environment 100. In operation, UE 110 requests access to a resource, such as destination 160, via wireless network 120. The request is received by RAN 121 of wireless network 120 and transmitted to mobility management function 123 of wireless network 120. Mobility management function 123 creates a session in relation to the request and forwards the request to session manager 124.

Upon receiving the request from mobility management function 123, session manager 124 determines a workflow for registering the device for access to wireless network 120. In an implementation, session manager 124 is directed to a workflow selection based on one or more parameters of the request from mobility management function 123 according to a selection algorithm. The selection algorithm determines the most suitable workflow for registering the device, wherein suitability may relate to the probability of successful completion of the request, speed of registering the device for access, possible denial of the request based on access control policies, and so on. If/when session manager 124 determines that the registration request qualifies for an expedited workflow, session manager 124 proceeds with establishing a traffic routing capability for the request by selecting a suitable or the most suitable traffic routing function (in this exemplary scenario, traffic routing function 122) from a pool of traffic routing functions (not shown) and requesting a traffic routing session be created by traffic routing function 122 for the access.

Having established a traffic routing scheme for the access and in accordance with the expedited workflow, session manager 124 sends a request to establish an access session to policy enforcement function 125 of wireless network 120. The request sent to policy enforcement function 125 includes the traffic routing information of the traffic routing session created by traffic routing function 122. Having received the information necessary to establish access, policy enforcement function 125 creates a session, such as a PDU session, which includes access control policies which will govern the access. With sessions created by traffic routing function 122 and policy enforcement function 125, session manager 123 sends a response to the registration request to UE 110 by which UE 110 can proceed with accessing wireless network 120 to connect with destination 160.

Figure 3:
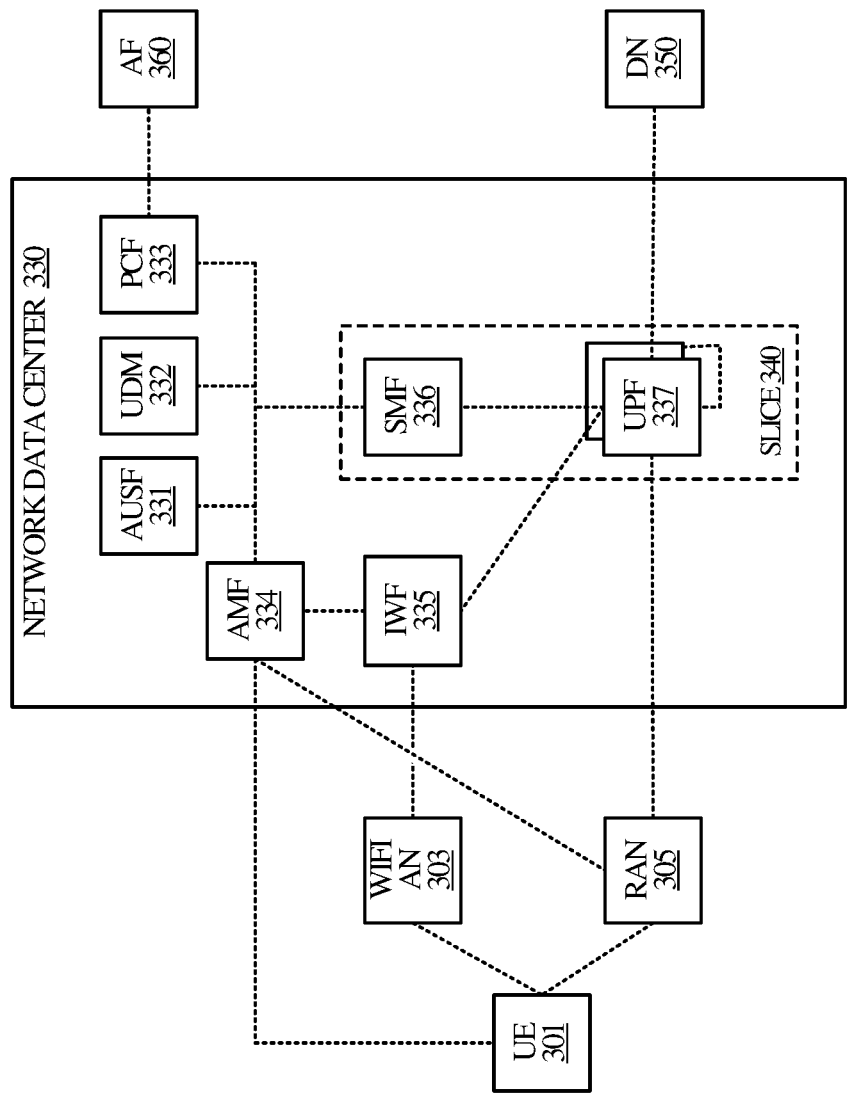
FIG. 3 illustrates an operational architecture for a network data center of a wireless communication network in an implementation.

FIG. 3 illustrates exemplary wireless communication system 300 that serves wireless User Equipment (UE) 301 based on policies. Wireless communication system 300 comprises UE 301, Wifi Access Node (AN) 303, 5GNR RAN 305, Interworking Function (IWF) 335, Access and Mobility Management Function (AMF) 334, Authentication Server Function (AUSF) 331, Unified Data Management (UDM) 332, Policy Control Function (PCF) 333, Session Management Function (SMF) 336, User Plane Function (UPF) 337, and Application Function (AF) 360. AF 360 may provide policies applicable to control plane functions, that is, to the application, presentation, and/or session layers of the OSI protocol stack. IWF 335 includes non-3GPP IWFs (N3IWFs) for providing untrusted non-3GPP access to network data center 330, such as access via a non-cellular access network. Wireless network slice 340 includes UPF 337 and SMF 336. DN 350 is representative of a data network, Internet access, third-party resource, or other endpoint of an end-to-end communication path from UE 301.

In an implementation, UE 301 communicates with network data center 330 via 5GNR access node 305 or Wifi access node 303. UE 301 requests access to DN 350 via the communication network of network data center 330. SMF 336 receives the access request from AMF 334 and other network functions of the communication network which are enforcing various aspects of the access request from UE 301. SMF 336 receives policies or policy decisions from AUSF 331, UDM 332, PCF 333, and/or AMF 334.

Figure 4:
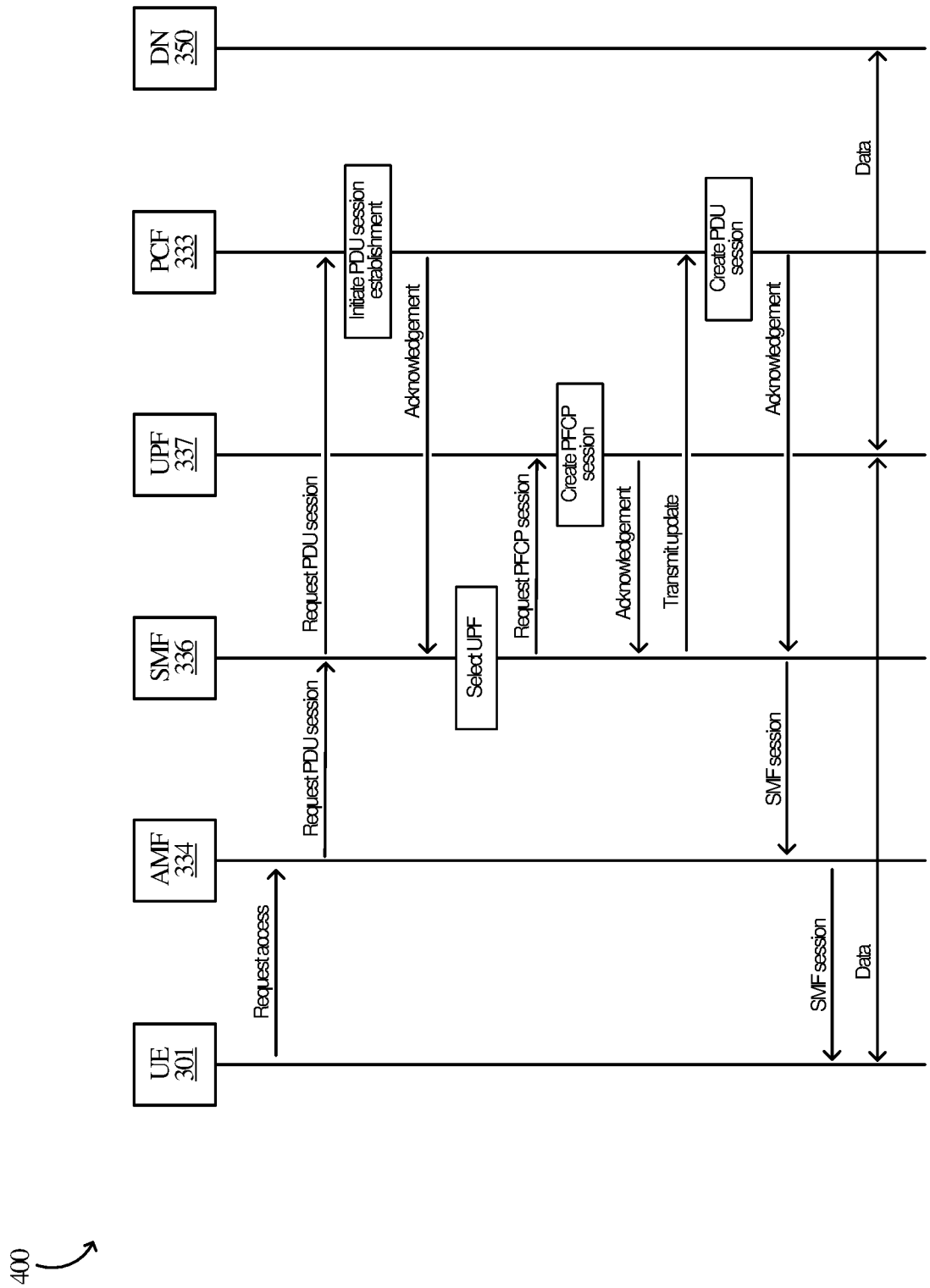
FIG. 4 illustrates a workflow for operating a wireless network for device registration in an implementation.
Figure 5:
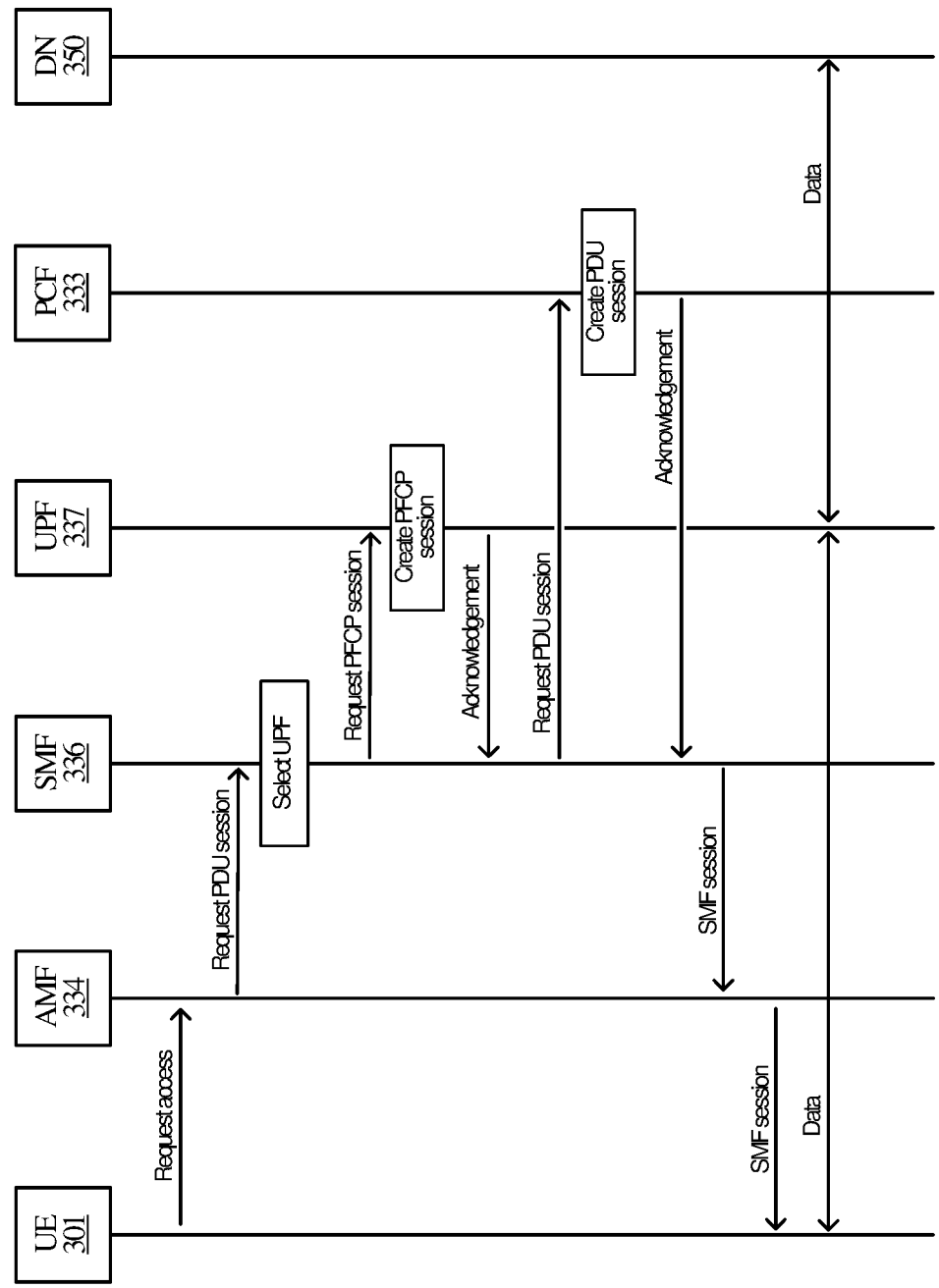
FIG. 5 illustrates a workflow for operating a wireless network for device registration in an implementation.

FIGS. 4 and 5 illustrate workflows 400 and 500, respectively, for processing a registration request of a user device for access to wireless network referring to elements of FIG. 3. FIG. 4 illustrates workflow 400 for registering a user device according to a standard or default workflow, such as a workflow prescribed by 3GPP standards, in an implementation. FIG. 5 illustrates workflow 500 for registering a user device according to an expedited workflow in an implementation.

In workflow 400 of FIG. 4, UE 301 requests access to a wireless communication network associated with network data center 300. The request is sent to AMF 334 via an access node such as RAN 305 or Wifi AN 303. AMF 334 creates a session with respect to the request and sends a request for a PDU session to SMF 336. The request sent by AMF 334 includes parameters such as an AMF session identifier, a user equipment identifier (UE ID), location of the device, PLMN, RAT, time zone, and cellular tower identifier, and so on.

SMF 336 receives the request from AMF 334 and sends a request to PCF 333 to create a PDU session. The request sent by SMF 336 includes request parameters such as the DNN, PLMN, and RAT. Upon receiving the request from SMF 336, PCF 333 initiates a process of setting up a PDU session based on information provided by SMF 336 and information gathered from other network functions which relate to the user device and/or the requested access. PCF 333 transmits a message acknowledging receipt of receiving the request ("200 OK") to SMF 336.

Upon receiving the acknowledgement, SMF 336 selects UPF 337 to handle data traffic associated with the request, based on parameters of the device and its request for access. SMF 336 sends a request to create a PFCP session to UPF 337, which initiates a process of establishing the PFCP session and sends an acknowledgement of the request to SMF 336. However, PCF 333 lacks sufficient information to complete the process of creating a session for the access request, and the information sent by SMF 336 is stored by PCF 333 until more information is received.

With UPF 337 selected and the PFCP session established, SMF 336 sends another message to PCF updating its initial request with the data routing information, i.e., an IP address assigned to UE 301 and the selected UPF 337. When PCF 333 sends an acknowledgement of this update to SMF 336, SMF 336 proceeds with sending to AMF 334 an SMF session ID associated with the access request as well as information relating to the PFCP session created by UPF 337 and the PDU session created by PCF 333.

Turning now to FIG. 5, in workflow 500, UE 301 requests access to a wireless communication network associated with network data center 300. As with workflow 400, AMF 334 creates a session with respect to the request and sends a request for a PDU session to SMF 336. Next, SMF 336 receives the request from AMF 334 and uses the parameters of the request to determine that the access request qualifies for an expedited workflow and selects UPF 337 to handle data traffic associated with the request.

To implement the expedited workflow, SMF 336 sends a request for a PFCP session to UPF 337 prior to sending a request for session establishment to PCF 333. UPF 337 creates the PFCP session and sends an acknowledgement of the request to SMF 336. With the PFCP session established, SMF 336 proceeds with contacting PCF 333 to establish a PDU session. However, in workflow 500, the initial message sent by SMF 336 to PCF 333 to establish the PDU session contains information sufficient for PCF 333 to create a PDU session with no further updates necessary. When PCF 333 sends an acknowledgement of PDU session establishment to SMF 336, SMF 336 proceeds with sending to AMF 334 an SMF session ID associated with the access request as well as information relating to the PFCP session created by UPF 337 and the PDU session created by PCF 333.

Figure 6:
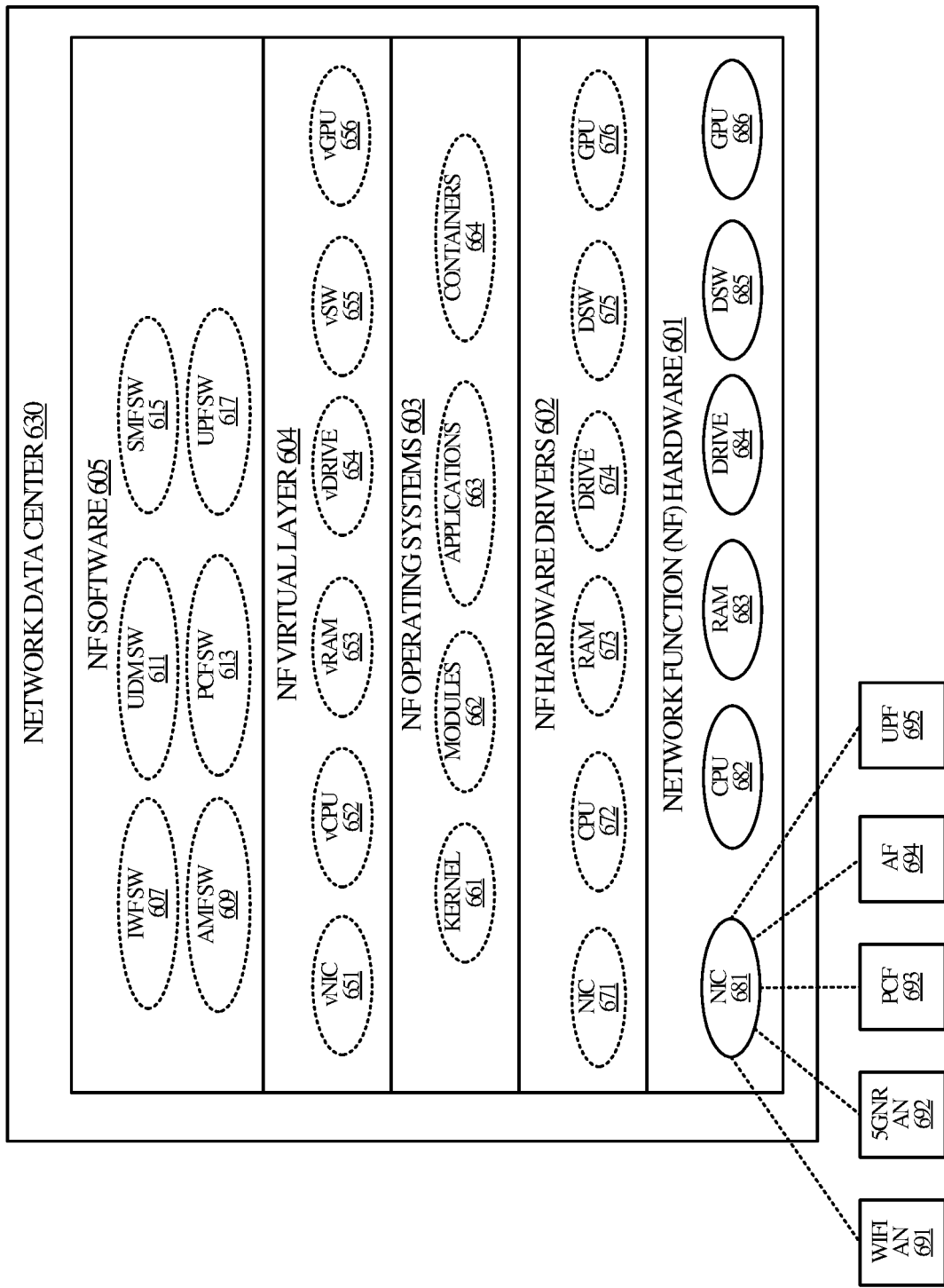
FIG. 6 illustrates a systems architecture for a network data center of a wireless communication network in an implementation.

FIG. 6 illustrates exemplary network data center 630, a network core of a wireless communication system, of which wireless network 120 of FIG. 1 is representative. Network data center 630 includes network function (NF) software 605, network function virtual layer 604, network function operating systems 603, network function hardware drivers 602, and network function hardware 601.

Network function software 605 of network data center 630 includes software for executing various network functions: IWF software 607, AMF software 609, UDM software 611, PCF software 613, SMF software 615, and UPF software 617. Other network function software, such as network repository function (NRF) software, are typically present but are omitted for clarity.

Network function virtual layer 604 includes virtualized components of network data center 630, such as virtual NIC 651, virtual CPU 652, virtual RAM 653, virtual drive 654, virtual software 655, and virtual GPU 656. Network operating systems 603 includes components for operating network data center 630, including kernels 661, modules 662, applications 663, and containers 664 for network function software execution. Network function hardware drivers 602 include software for operating network function hardware 601 of network data center 630, including network interface card (NIC) drivers 671 for network interface cards (NICs) 681, CPU drivers 672 for CPUs 682. RAM drivers 673 for RAM 683, flash/disk drive drivers 674 for flash/disk drives 684, data switch (DSW) drivers 675 for data switches 685, and drivers 676 for GPUs 686. Network interface cards 681 of network function hardware 601 include hardware components for communicating with Wifi access node 691, 5GNR access node 692, PCF 693, application server 694, and UPF 695.

Turning now to FIG. 7, architecture 700 illustrates computing device 701 that is representative of any system or collection of systems in which the various processes, programs, services, and scenarios disclosed herein may be implemented. Examples of computing device 701 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 701 may be implemented as a single apparatus, system, or device or may be implemented in a distributed manner as multiple apparatuses, systems, or devices. Computing device 701 includes, but is not limited to, processing system 702, storage system 703, software 705, communication interface system 707, and user interface system 709 (optional). Processing system 702 is operatively coupled with storage system 703, communication interface system 707, and user interface system 709.

Processing system 702 loads and executes software 705 from storage system 703. Software 705 includes and implements device registration process 706, which is representative of the device registration processes discussed with respect to the preceding Figures, such as process 200. When executed by processing system 702, software 705 directs processing system 702 to operate as described herein for at least the various processes, operational scenarios, and sequences discussed in the foregoing implementations. Computing device 701 may optionally include additional devices, features, or function not discussed for purposes of brevity.

Referring still to FIG. 7, processing system 702 may comprise a micro-processor and other circuitry that retrieves and executes software 705 from storage system 703. Processing system 702 may be implemented within a single processing device but may also be distributed across multiple processing devices or sub-systems that cooperate in executing program instructions. Examples of processing system 702 include general purpose central processing units, graphical processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 703 may also include computer readable communication media over which at least some of software 705 may be communicated internally or externally. Storage system 703 may be implemented as a single storage device but may also be implemented across multiple storage devices or sub-systems co-located or distributed relative to each other. Storage system 703 may comprise additional elements, such as a controller, capable of communicating with processing system 702 or possibly other systems.

Software 705 (including device registration process 706) may be implemented in program instructions and among other functions may, when executed by processing system 702, direct processing system 702 to operate as described with respect to the various operational scenarios, sequences, and processes illustrated herein. For example, software 705 may include program instructions for implementing the device registration processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtualization software, or other application software. Software 705 may also comprise firmware or some other form of machine-readable processing instructions executable by processing system 702.

In general, software 705 may, when loaded into processing system 702 and executed, transform a suitable apparatus, system, or device (of which computing device 701 is representative) overall from a general-purpose computing system into a special-purpose computing system customized to support device registration. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary, etc.

For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless network, wherein the wireless network includes a session manager, a traffic routing function, and a policy enforcement function, the method comprising:
by the session manager:
receiving, from a user device, a registration request for access to the wireless network by the user device;
selecting an expedited registration process from a set of registration processes for the access based on parameters relating to the registration request, wherein the set of registration processes comprises the expedited registration process and a default registration process;
based on the expedited registration process:
prior to sending a request for an access session from the policy enforcement function, selecting the traffic routing function of the wireless network for the access;
requesting, from the traffic routing function, a traffic management session relating to the access;
sending, to a policy enforcement function of the wireless network, a request to establish the access, wherein the request includes traffic routing information; and
sending, to the user device, a response to the registration request, wherein the response comprises information by which the user device accesses the wireless network.

2. The method of claim 1, wherein selecting the traffic routing function comprises selecting the traffic routing function based on one or more of: Quality of Service (QoS), network topology, and a geographic location of the user device.

3. The method of claim 1, wherein the parameters include one or more of: a Data Network Name (DNN), an Access Point Name (APN), a Public Land Mobile Network (PLMN), a geographic location of the user device, a Radio Access Technology (RAT) type, and a Subscription Permanent Identifier (SUPI) of the user device.

4. The method of claim 1, wherein the traffic routing function comprises a User Plane Function (UPF), the policy enforcement function comprises a Policy Control Function (PCF), and the session manager comprises a Session Management Function (SMF).

5. The method of claim 4, wherein the traffic management session comprises a Packet Forwarding Control Protocol (PFCP) session.

6. The method of claim 4, wherein the access comprises a Protocol Data Unit (PDU) session.

7. The method of claim 1, wherein the session manager communicates with the policy enforcement function via an N7 interface.

8. A method operating a wireless communication network, wherein the wireless network includes a session manager, a traffic routing function, and a policy enforcement function, the method comprising:
by the session manager:
receiving, from a user device, a registration request for access to the wireless network by the user device;
selecting an expedited registration process from a set of registration processes for the access based on parameters relating to the registration request, wherein the set of registration processes includes the expedited registration process and a default registration process; and
prior to sending a request for an access session to the policy enforcement function, selecting the traffic routing function of the wireless network for the access based on the expedited registration process;
by the traffic routing function:
receiving a request for a traffic management session relating to the registration request;
creating a traffic management session relating to the registration request; and sending traffic routing information to the session manager in response to the request;

by the session manager:
sending, to a policy enforcement function of the wireless network, a request to create an access session in relation to the registration request, wherein the request includes the traffic routing information;

by the policy enforcement function:
creating an access session in response to the request to create an access session;

by the session manager:
sending, to the user device, a response to the registration request, wherein the response comprises information by which the user device accesses the wireless network.

9. The method of claim 8, wherein selecting the traffic routing function comprises selecting the traffic routing function based on one or more of: Quality of Service (QoS), network topology, and a geographic location of the user device.

10. The method of claim 8, wherein the parameters include one or more of: a Data Network Name (DNN), an Access Point Name (APN), a Public Land Mobile Network (PLMN), a geographic location of the user device, a Radio Access Technology (RAT) type, and a Subscription Permanent Identifier (SUPI) of the user device.

11. The method of claim 8, wherein the traffic routing function comprises a User Plane Function (UPF), the policy enforcement function comprises a Policy Control Function (PCF), and the session manager comprises a Session Management Function (SMF).

12. The method of claim 11, wherein the traffic management session comprises a Packet Forwarding Control Protocol (PFCP) session.

13. The method of claim 11, wherein the access comprises a Protocol Data Unit (PDU) session.

14. The method of claim 8, wherein the session manager communicates with the policy enforcement function via an N7 interface.

15. A computing apparatus comprising:
one or more computer-readable storage media;
one or more processors operatively coupled with the one or more computer-readable storage media; and
program instructions stored on the one or more computer-readable storage media that, when executed by the one or more processors, direct the computing apparatus to:
receive, from a user device, a registration request for access to the wireless network by the user device;
select an expedited registration process from a set of registration processes for the access based on parameters relating to the registration request, wherein the set of registration processes includes the expedited registration process and a default registration process;
based on the expedited registration process:
prior to sending a request for an access session from the policy enforcement function, select the traffic routing function of the wireless network for the access;
request, from the traffic routing function, a traffic management session relating to the access;
send, to a policy enforcement function of the wireless network, a request to establish the access, wherein the request includes traffic routing information; and
send, to the user device, a response to the registration request, wherein the response comprises information by which the user device accesses the wireless network.

16. The computing apparatus of claim 15, wherein to select the traffic routing function, the program instructions direct the computing apparatus to select the traffic routing function based on one or more of: Quality of Service (QoS), network topology, and a geographic location of the user device.

17. The computing apparatus of claim 15, wherein the parameters include one or more of: a Data Network Name (DNN), an Access Point Name (APN), a Public Land Mobile Network (PLMN), a geographic location of the user device, a Radio Access Technology (RAT) type, and a Subscription Permanent Identifier (SUPI) of the user device.

18. The computing apparatus of claim 15, wherein the traffic routing function comprises a User Plane Function (UPF), the policy enforcement function comprises a Policy Control Function (PCF), and the session manager comprises a Session Management Function (SMF).

19. The computing apparatus of claim 18, wherein the traffic management session comprises a Packet Forwarding Control Protocol (PFCP) session.

20. The computing apparatus of claim 18, wherein the access comprises a Protocol Data Unit (PDU) session.

* * * * *